United States Patent [19]
Wurtz et al.

[11] 4,113,408
[45] Sep. 12, 1978

[54] WIND GENERATOR SYSTEM

[75] Inventors: Frank R. Wurtz, Simi; Thomas J. Hawkins, Los Angeles, both of Calif.

[73] Assignee: Frank R. Wurtz, Simi Valley, Calif.

[21] Appl. No.: 772,270

[22] Filed: Feb. 25, 1977

[51] Int. Cl.² .............................................. F03D 7/06
[52] U.S. Cl. .................................... 416/17; 416/117; 416/155; 416/158
[58] Field of Search ................... 416/17, 117, 50, 155, 416/37, 9, 158, DIG. 4, DIG. 6

[56] References Cited

U.S. PATENT DOCUMENTS

| 609,378 | 8/1898 | Weitzel | 416/50 |
|---|---|---|---|
| 1,180,085 | 4/1916 | Stirtan | 416/50 |
| 1,791,731 | 2/1931 | Madarasz | 416/9 X |
| 2,006,024 | 6/1935 | Lockwood | 416/118 X |
| 2,603,300 | 7/1952 | King | 416/17 X |
| 3,920,354 | 11/1975 | Deckek | 416/140 X |

FOREIGN PATENT DOCUMENTS

| 650,805 | 2/1929 | France | 416/9 |
| 2,289,769 | 5/1976 | France | 416/119 |

Primary Examiner—Everette A. Powell, Jr.
Attorney, Agent, or Firm—Roger A. Marrs

[57] ABSTRACT

A wind operated generator is disclosed herein having a stationary frame or base rotatably supporting at least four sets of pivotal blades intended to be driven by impinging wind currents. Each set of blades operate in unison for opening and closing air passageways between adjacent ones of the blades as the sets of blades rotate about a common vertical axis. A wind direction sensor is provided which moves into the direction of the wind and electro-mechanical or electrical interface networks operably couple the wind direction sensor to the respective sets of blades whereby the blades are responsive to wind direction so as to be properly feathered to propel the sets of blades. By employment of the interface network, those blades that are in position to actuate or rotate the windmill will receive the full force of the wind while other blades which are not in a position to accomplish the proper operation will be turned to permit passage of the wind thereby.

8 Claims, 9 Drawing Figures

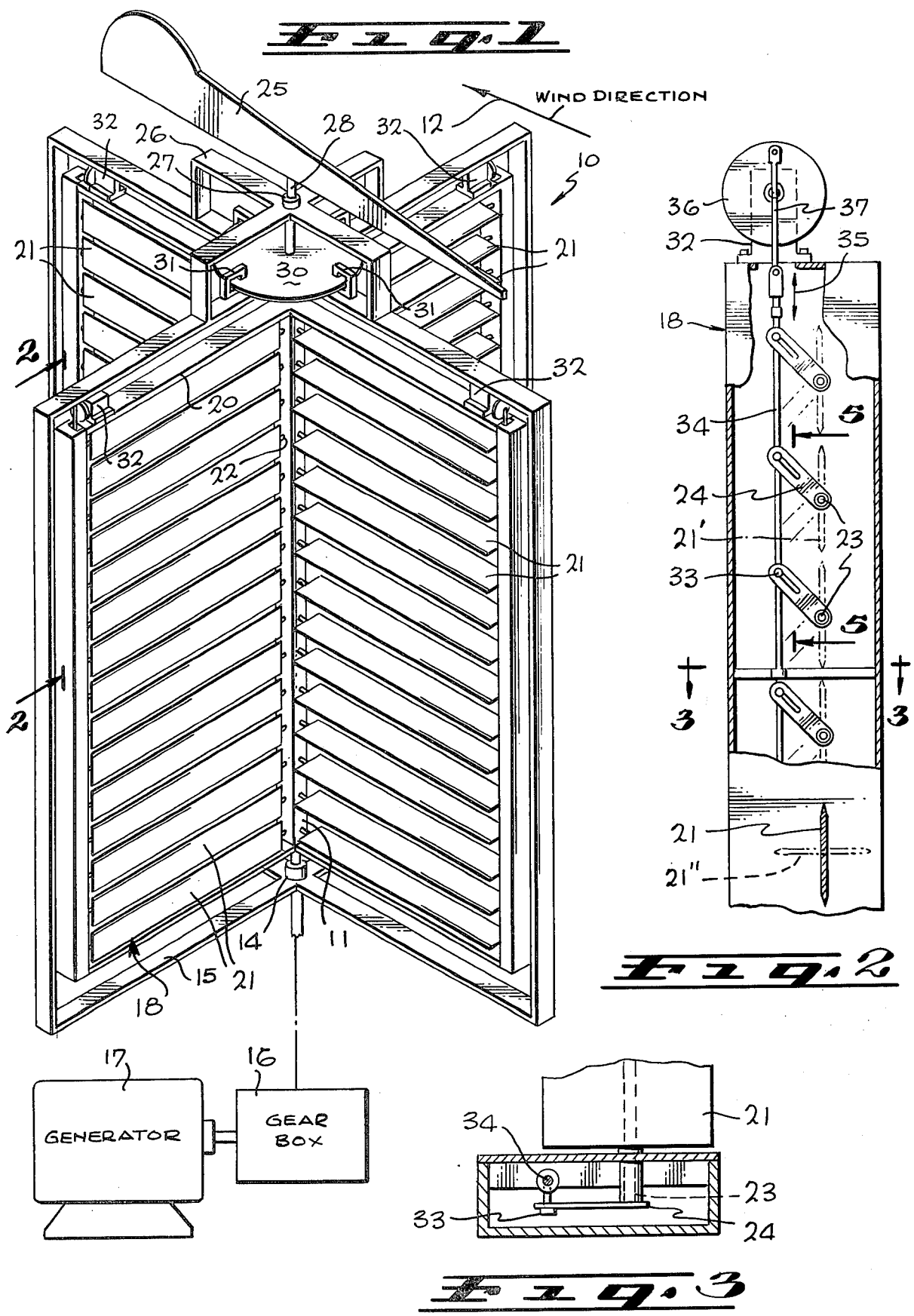

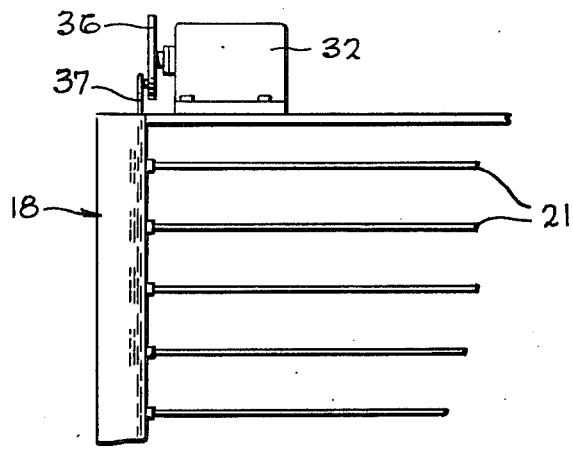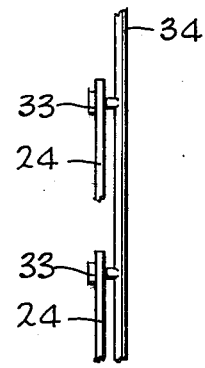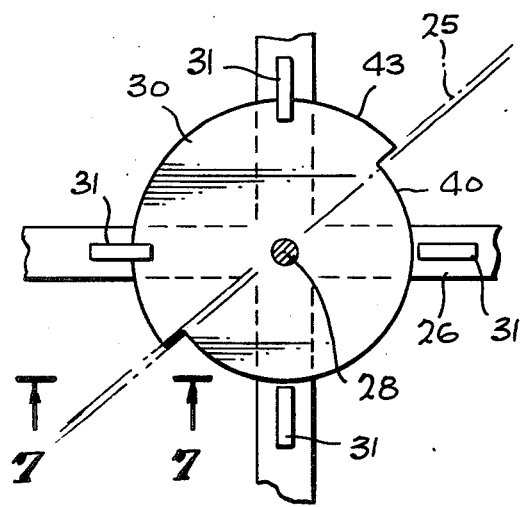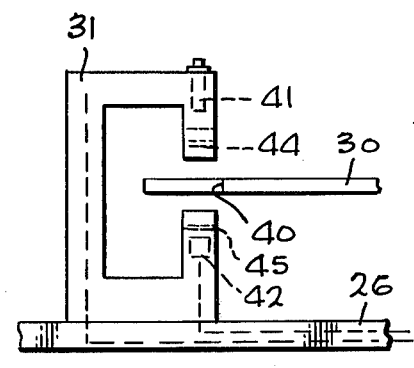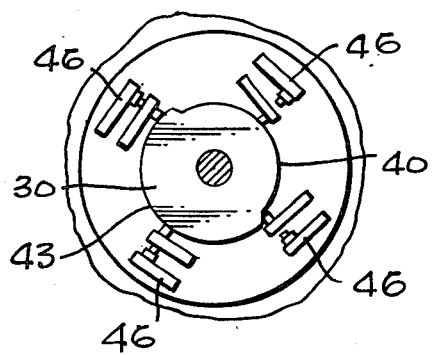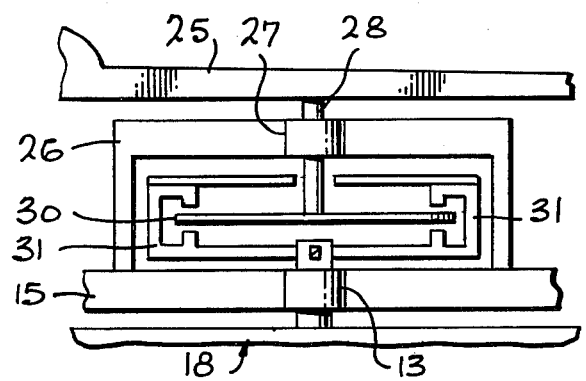

WIND GENERATOR SYSTEM

BACKGROUND OF THE INVENTION

1. Field of the Invention

This invention relates to the field of revolving windmills and more particularly to a windmill structure having a plurality of feathering blades adapted to be automatically set by the motion or direction of the wind via electro-mechanical or electrical interface means.

2. Brief Description of the Prior Art

In the past, it has been the conventional practice to employ windmills for converting the strength of the wind to useful power or work. Such a conversion is extremely important in modern times when energy supplies are being recognized as limited and the non-polluting, almost always available source of power in the wind is an important resource to be developed. Formerly, windmills have performed various useful tasks such as pumping water, generating power and operating machinery and the like. Usually, such windmills utilize the well-known vertical plane, horizontal axis windmills which employ rudder means to maintain the fan or blades of the mill facing into the wind so as to maximize power output. In many instances, considerable drag is imposed on the fans, louvers or blades of the windmill as the rotation of the mill causes the blades to meet the oncoming wind stream in a closed position. To avoid this problem, mechanical devices have been employed for moving the blades or vanes into feathering or operating positions; however, such mechanisms themselves are often complex, expensive, unwieldy and ineffecient. Such prior attempts at providing automatic feathering using mechanical means are shown and described in U.S. Pat. Nos. 3,976,396, 3,920,354 and 3,743,848. The mechanical means for positioning the blades or vanes from operating positions normally closing air passage ways through the windmill and in feathering positions so that the air passageways are open to oncoming air are slow in response to change of wind conditions and direction so that the efficiency of the windmill is greatly reduced.

Therefore, there has been a long standing need to provide a wind generator system having an interface means responsive to change of wind direction for operatively positioning or feathering the blades or vanes of a windmill system. The response time should be rapid and sensitivity of change in wind direction must be provided.

SUMMARY OF THE INVENTION

Accordingly, the above problems and difficulties encountered with the prior systems are obviated by the present invention which provides a wind generator system having a stationary frame supporting at least four sets of pivotal vanes or blades mounted so as to rotate about a vertical axis. Means are provided on each set of blades for moving the blades between positions of fully closed and fully opened so that the plurality of blade sets will rotate about the vertical axis whereby blades moving against the wind will be feathered and those blades moving with the wind will be closed. The feature of the present invention is to provide electromechanical or electrical means serving as an interface between a wind direction sensor and the pivotal blades carried on each of the sets for operating or positioning the blades in response to wind change and to wind strength.

In one form of the invention, the wind direction sensor includes a vane means operably moving a photoelectric detector which in turn is electrically connected to the positioning means of the blades. In another form, a communtator arrangement of contact switch means may be provided.

Therefore, it is among the primary objects of the present invention to provide a windmill generator system arranged with feathering blades or vanes having electro-mechanical or electrical means interconnected to and responsive to a wind strength and direction sensor means so as to position or rearrange the blades accordingly.

Another object of the present invention is to provide a novel windmill having a plurality of feathering blades adapted to be automatically set by the action of the wind via electronic, electrical or electro-mechanical means whereby effeciency and simplicity of construction is provided.

Still another object of the present invention is to provide a novel wind generator system having a plurality of sets of pivotal vanes or blades adapted to rotate about a vertical axis wherein the pivotal positioning of the blades of each set are responsive to a sensing and detecting means coupled to the blades via electromechanical or electronic coupling means.

Yet another object of the present invention is to provide an improved windmill for producing power incorporating electronic interface means between a wind sensor and a pivotal blades wherein the overall efficiency and sensitivity of the apparatus is enhanced.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of the novel wind generator system of the present invention illustrated in a typical application for operating a motor generator set;

FIG. 2 is an enlarged side elevational view, partly in section, of one of the sets of blades incorporated into the apparatus of FIG. 1 as taken in the direction of arrows 2—2 thereof;

FIG. 3 is a transverse cross-sectional view of the set of blades shown in FIG. 2 as taken in the direction of arrows 3—3 thereof;

FIG. 4 is a fragmentary front elevational view of the electrical means for positioning the blades of each set employed in the apparatus of FIG. 1;

FIG. 5 is an elevational view showing the crank mechanism for pivoting the blades of each blade set taken in the direction of arrow 5—5 of FIG. 2;

FIG. 6 is a top plan view of the windmill apparatus shown in FIG. 1 illustrating the wind direction and strength sensor;

FIG. 7 is an enlarged elevational view of the sensing device shown in FIG. 6 as taken in the direction of arrows 7—7 thereof;

FIG. 8 is an enlarged view of the sensing and detecting apparatus illustrated in FIGS. 6 and 7 illustrating the interconnecting means to the sets of blades; and FIG. 9 is a plan view of another sensing embodiment for use in the apparatus of FIG. 1.

DESCRIPTION OF THE PREFERRED EMBODIMENT

Referring to FIG 1, the novel windmill generator apparatus of the present invention is illustrated in the general direction of arrow 10 and is shown as an omni-directional, horizontally pivoted blade or vane device which, as illustrated, rotates in a counter-clockwise direction. Rotational movement is about a central axis or shaft 11 when the wind blows in the direction such as indicated by arrow 12. Shaft 11 is moveably held by upper and lower bearings 13 and 14 carried on a stationary frame 15. Rotation of the shaft is translated into useful work, power or load by a step-up gear box 16 operably coupled to a generator 17.

Radiating outwardly from its support on the shaft 11 is at least four sets of pivotal blades or vanes. Numeral 18 indicates one of the sets of blades which includes a frame 20 cantilevered outwardly from shaft 11 adjacent the top and bottom bearings 13 and 14. Extending along the length of the frame 20, there is a plurality of blades, louvers or vanes 21 wherein each blade is pivotally carried by inner and outer end pins 22 and 23. The pins 22 are rotatably carried on the shaft 11 while the pins 23 are secured to one end of a link 24 as seen more clearly in FIG. 2.

The direction of the wind is detected or sensed by an elongated wind vane 25 which is carried on the end of shaft 28. However, the vane 25 does not rotate with shaft 11 but is rotatably carried on the stationary frame 15 represented by a top frame 26. A bearing 27 rotatably carries the vane mounting shaft 28 on the top frame 26. The terminating end shaft 28 is secured to a disk 30 forming a part of the wind detector or sensor so that as the wind direction vane 25 moves in accordance with the changes of wind direction, the shaft 27 will rotate so as to rotate the disk 30 accordingly. A plurality of electronic or electro-mechanical sensors, such as indicated by numeral 31 are operably connected to the disk so as to transmit operating signals to a motor 32 carried on each of the sets of blades. In general, the wind vane 25 will move in accordance with variations of wind direction and this movement is followed by rotation of the disk 30. The sensors 31 detect the movement of the disk 30 and this movement is signalled to the respective motors on the sets of blades 18. Further description will be achieved with respect to the discussion of FIGS. 2-8 inclusive.

The windmill generator apparatus of the present invention affords a electro-mechanical mechanism in which a vertical shaft may be actuated and the plurality of blade sets moved or rotated accordingly. The horizontal blades are pivotally supported in such a manner that those which can be set at a proper angle to communicate movement to the shaft may so act at the same time upon other vanes or blades as to arrange them so as not to offer resistance to the air. The mechanism is of a character to automatically bring the vanes progressively into position to actuate the shaft.

Referring now in detail to FIG. 2, it can be seen that each of the blades 21 is attached to one end of a lever or link 24 while the opposite end of the lever or link 24 includes an elongated slot slideably disposed over a pin 33 carried on a movement rod 34. The rod 34 is adapted to move in a rectilinear vertical direction as indicated by arrow 35 and one end of the rod is attached in an eccentric manner to a drive wheel 36. The drive wheel 36 is operated by a respective motor 32 so that as it rotates in the direction of the arrow indicated, a connecting bell crank 37 moves the rod 34 in its intended up and down vertical direction. This movement causes the blades 21 to move from a substantially closed position as shown by the numerical character 21' to an open position as shown by the character 21".

In FIG. 3, it can be seen that the rod 34 is connected to pin 33 and that pin 33 will ride within the slot formed in link 24. Link 24 is attached to the pin 33 so that the blade 21 will rotate between the positions of 21' and 21" as shown in FIG. 2. In FIG. 5, the relationship of the rod 34 and the link 24 is more currently portrayed wherein it can be seen that the pin 33 is fixedly attached to the rod on one end and loosely attached to the link 24 on its opposite end. Therefore, as the rod 34 moves up and down in response to the eccentric wheel 36 moved by motor 32, the links 24 will rock or pivot on pins 33 to position the blades accordingly.

In FIG. 4, another view is shown of the motor 32 in operable coupling to the blades 21 via the rod 34, crank 37 and wheel 36. It is to be understood that the energization of motor 32 is in accordance with the sensors 31 responsive to the positioning of disk 30 following the movement of the wind direction vane 25.

Referring now in detail to FIG. 6, a top plan view of the wind direction sensing means is illustrated wherein it can be seen that the disk 30 includes a semi-circular portion of reduced perimeter identified by numeral 40 which exposes the sensing means 31 so as to permit a light beam to pass between a light source and a light receiving source identified by numerals 41 and 42 respectively in FIG. 7. It can be seen that the perimeter 40 is of reduced diameter as compared to the enlarged perimeter 43 such that a beam of light can extend past the disk 30 for approximately 180 degrees until the enlarged perimeter 43 blocks the light so projected. The photo-electric system can include the light source 41, a colimating lens 44, a daylight filter 45 and the light detector 42. The light 41 and detector 42 are operably coupled to the motor 32 so that the motor will be responsive to operate according to the position of the disk 30. By this means, construction is shown for providing the proper timing for opening and closing the wind blades or vanes in the set of blades 18. The sensing or timing wheel 30 is solidly attached to the wind vane shaft 28 as shown in FIG. 8 and rotates with the wind vane 25. The shaft 28 is attached to the top frame 26 by means of a bearing 27.

The detectors 31, one for each set of blades for the generator, are attached to the blade set shaft 11 adjacent the top bearing 13 so as to rotate with the shaft 11. When a sensor or detector receives a light signal, the detector commands or signals the blades 21 to close via the electric motor 32 and the coupling means to the blades so that the blades close. The detector or sensing system may incorporate an advance mechanism, if needed.

In FIG. 9, an alternate detection system is shown wherein the photo-electric light sensor is replaced by electrical contacts such as a contact closure set 46. The contact sets are closed when a moveable contact rides on the enlarged periphery 43 and the contact closures are opened when the moveable contact via its cam rides on the reduced perimeter 40. The opening and closing of the respective contacts energize and de-energize the motors 32 as previously described. It is to be understood that whether the contacts 46 or the photo-electric sensor 31 is employed, suitable electrical energy may be provided by an auxillary battery so that the motor may be sufficiently operated.

In view of the foregoing, it can be seen that the windmill generator apparatus of the present invention provides a means for producing maximum efficiency in the field of wind generators. The sets of blades or vanes will produce maximum attenuation to the wind in a forward direction and minimum attenuation to the wind in the reverse direction. The system may incorporate a step-up gearing to drive generators in order to charge batteries. The blades may be opened and closed by a latching-type mechanism such as solenoids, electrical motors or the like in order to minimize power and balancing the blades also minimizes power or load factor.

The sets of blades operates as follows: when the wind reaches a certain speed and direction the system commences to operate. The dead center direction of the wind will be detected by the vane 25 and the blades progressing past the center direction of the wind would be detected by the sensing means including disk 30 and sensors 31 and the blades just after dead center and before 180° after dead center would close showing a solid surface to the wind while the other blades would remain open causing a minimum wind resistance. As each set of blades passes dead center they would close and just before 180° later the blades would open. Signals would be transmitted to and from the blades via the accurate slip ring assembly. If each blade were to be operated individually a type of speed control may be incorporated by detecting the wind velocity and electronically controlling the number of blades which close at any one time. Furthermore, additional means may be provided for terminating operating of the apparatus in the event of extreme wind conditions such as in the event of hurricane force winds and also in the event that the system is employed for charging batteries wherein the batteries are fully charged and further charge would damage or reduce effectiveness of the batteries involved. In these latter instances, means can be provided for disabling rotation of the blade sets and such means may include a brake mechanism.

It is contemplated by the present inventive concept to employ other mechanisms besides the driving wheel 36, crank 37 and rod 34 to rotate the blades. Belts, pulleys and spring loaded mechanisms may also be employed for advantage. Also, the rod 34 is understood to be captive to the frame 20 so that only reciprocal vertical travel is permitted in response to the off-set or eccentric movement of the crank 37 pivotally connected thereto.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Windmill generator apparatus for converting natural wind forces into useful energy comprising the combination of:
   a stationary frame;
   a shaft having a vertical longitudinal axis rotatably carried on said stationary frame;
   at least four sets of blades outwardly extending from said rotatable shaft at approximately 90° angles with respect to each other;
   each of sets of blades having a plurality of blades pivotally mounted on said shaft so as to rotate therewith and pivot between an open position defining a multiplicity of air passageways therebetween and a closed position occupying said air passageways;
   wind direction sensing means moveably carried on and encased by said stationary frame and operably connected to said blades of said blade sets for actuating said blades between their open and closed position responsive to changes of oncoming wind direction;
   electro-mechanical means interconnecting said wind direction sensing means with said blades which includes:
   an electrical motor having a drive wheel and a rod connected to said wheel off-set from its center and said blades moveably connected to said rod at their ends opposite to the ends pivotally mounted on said shaft;
   said wind direction sensing means includes:
   a rotatable disk carried on said stationary frame;
   a wind vane attached to said disk and responsive to change of wind direction to rotate said disk accordngly; and
   electrical detection means responsive to rotation of said disk for selectively operating said blades between their respective open and closed positions.

2. The invention as defined in claim 1
   wherein said disk includes:
   a perimeter of reduced perimeter and diameter extending for 180° and an enlarged perimeter and diameter extending for the remaining 180° of said disk;
   said electrical detection means operable in response to the presence or non-presence of said reduced perimeter and enlarged perimeter to pivot selected ones of said blade sets accordingly.

3. The invention as defined in claim 2
   wherein said detection means includes photo-electric means disposed on opposite sides of said disk wherein said enlarged perimeter interferes with light passage to transmit a signal to move said blades into the open position and permits passage of light to transmit another signal to move said blades into the closed position.

4. The invention as defined in claim 3
   wherein said disk is attached to said wind vane whereby said disk and said wind vane rotate in unison.

5. The invention as defined in claim 2
   wherein said detection means includes a set of contact closures selectively operated by rotation of said disk functioning as a timing device to open and close said passageways between said blades on selected ones of said sets of blades.

6. The invention as defined in claim 2
   wherein said detection means is an electronic interface network operable between said rotating disk and said sets of blades to open and close said passageways between said blades on selected ones of said sets of blades.

7. The invention as defined in claim 6
   wherein said electronic interface network includes a photo-electric sensing device operable to selectivity energize one of at least four electric motors operably coupled to respective ones of said sets of blades.

8. The invention as defined in claim 7 wherein said detection means further includes a vertically moveable rod eccentrically connected to a drive wheel operated by said motor;
lost-motion linkage moveably connecting one end of each of said blades to said rod so as to open and close said passageways in response to said detection means.